Patented Jan. 29, 1935

1,989,541

UNITED STATES PATENT OFFICE 1,989,541

PROCESS FOR DRYING SUBSTANCES

Jules Blanchod, Basel, Switzerland, assignor to Society of Chemical Industry in Basle, Basel, Switzerland No Drawing. Application October 8, 1932, Serial No. 636,949. In Switzerland October 17, 1931

4 Claims. (Cl. 202—42)

The phenomena which are manifested in the evaporation of mixtures of liquids have been used in the art of drying liquids and in that of separating water in chemical reactions.

According to this invention, the application of these phenomena for the production of dry preparations which contain or consist of diazo-compounds quantitatively produces particularly favorable results because it permits the separation, at comparatively very low temperatures, of water from solutions, pasty masses or moist preparations. The process has the further advantage that, together with the water, volatile acids which may be present are separated, so that the final product obtained is of neutral reaction. Finally, because the products are insoluble in the liquid immiscible with water, there may be performed simultaneously with the drying a purification operation, by which any impurities present, soluble in organic solvents, can be separated.

The process therefore is on the foregoing grounds quite especially suitable for obtaining solid diazo-preparations. In this particular instance the process, in contrast with the most generally known processes of separating, has the advantage that it works quantitatively and that one is not under the necessity of using stabilizers which at the same time are precipitating agents for the diazo-compounds. If desired the operation may be carried out without a stabilizer.

The process is carried out in such a manner that the aqueous diazo-compound, which may be in a moist, pasty or dissolved condition, is introduced into a suitable organic liquid, which liquid is then distilled with constant addition of fresh portions of the liquid until no more water is carried over.

As organic liquids which are suitable for carrying out the present operation there may be named such which can be evaporated below 50° C., preferably with aid of a more or less strong vacuum, and which are indifferent against diazo-compounds, that is to say which do not dissolve diazo-compounds and which, under the existing conditions (acid or neutral reaction and comparatively low temperature), do not react with the diazo-compound. Such liquids are esters and ethers of the aliphatic and aromatic series, hydrocarbons, etc. Particularly suitable are the liquids immiscible with water, such as aqueous aromatic and aliphatic hydrocarbons and the halogen substitution products thereof, such as benzene, benzine, petroleum, toluene, xylene, chlorobenzene, chlorotoluene, carbon tetrachloride, tetrachlorethane, further nitrobenzene, anisol, phenetol, etc.

The following examples illustrate the invention, the parts being by weight, unless otherwise stated.

Example 1

294 parts of 4-chloro-2-aminodiphenylether hydrochloride, containing base corresponding with 75 per cent. of its weight, are diazotized in known manner in hydrochloric acid solution and the diazonium hydrochloride is separated from the diazo-solution in the manner described in U. S. Patent No. 1,875,243. The salt is filtered and mixed, while still moist, with 4500 parts of toluene. The whole is then distilled by stirring in a vacuum at 20–30° C. and the distilled toluene, after separation of the water, is returned constantly into the distillation flask. When no more water is carried over together with the toluene, the distillation is interrupted, the suspension of the water-free salt in toluene is filtered, washed with toluene and well drained, and freed from the last traces of toluene by a short drying in a vacuum. There is obtained in this manner a yellow crystalline powder which dissolves clearly in water to a neutral solution.

Example 2

82.7 parts of the hydrochloride of 4-chloro-2-amino-1:1'-diphenylether of 79.6 per cent. strength are introduced into a mixture of 60 parts by volume of concentrated hydrochloric acid and 90 parts by weight of ice; the mixture is then diazotized with aid of a solution of 24 parts of sodium nitrite in 60 parts of water. The solution thus obtained is filtered from some oily matter which has separated and is mixed with a stabilizer, such as 45 parts of magnesium chlorobenzene-disulfonate and 45 parts of the sodium salt of the same acid. After the addition of the stabilizer, stirring is continued for about ½ hour; the pasty mass is charged into a distillation apparatus, together with 1000 parts of toluene and the toluene is distilled in a vacuum, for instance at a temperature between 25° C. and 30° C. under 30–36 mm. of mercury. The distilled toluene separates into two layers consisting on the one hand of toluene and on the other hand of a dilute hydrochloric acid. The toluene layer is removed and returned to the distillation apparatus. When the toluene vapor passes over without any water, filtration and drying follow. There is obtained an approximately white powder, which contains the original diazo-compound in substantially quantitative yield, and is free from all precipitable decomposition products of the diazo-compound. By mixing it with the usual auxiliary substances.

such as aluminium sulfate and sodium sulfate, it is converted into a diazo-compound ready for use.

Example 3

152 grams of 4-nitro-2-amino-1-toluene are diazotized in the usual manner in hydrochloric acid. The clear filtered diazo-solution, the volume of which is about 1 litre, is mixed with a mixture of 160 grams each of the magnesium and sodium salts of 1-chlorobenzene-2:4-disulfonic acid. The salts dissolve to a clear solution. This solution is now made up to 5 litres with toluene and distilled in a vacuum as described in Example 1 and the product finished as therein described. There is obtained the magnesium-diazonium double salt of the chlorobenzenedisulfonic acid in the form of a yellow powder freely soluble in water to a clear and neutral solution.

Example 4

152 parts of meta-nitro-para-toluidine are diazotized in the presence of an excess of hydrochloric acid and from the strongly acid diazonium solution the acid diazonium salt of the chlorobenzenedisulfonic acid is precipitated by addition of 320 parts of sodium 1-chlorobenzene-2:4-disulfonate. It is filtered and, while still moist, mixed with 4500 parts of toluene, distilled and finished, all as described in Example 1. There is obtained a quite dry white crystalline powder which dissolves in water to a clear and acid solution.

Example 5

294 parts of 4-chloro-2-aminodiphenylether hydrochloride, containing base corresponding with 75 per cent. of its weight, are diazotized in the usual manner in hydrochloric acid solution and to the diazo-solution there is added a mixture of 160 parts each of the magnesium and sodium salts of 1-chloro-benzene-2:4-disulfonic acid. The magnesium-diazonium double salt of chlorobenzenedisulfonic acid in part precipitates. The whole crystalline magma is introduced, without filtration, into 4500 parts of chlorobenzene, distilled and finished, all as described in Example 1. The diazonium salt is obtained in the form of a yellow powder soluble to a clear and neutral solution in water.

The procedure may be similar in the case of other diazo-compounds, for instance those from ortho-, para-, and meta-nitraniline, ortho-, para- and meta-chloraniline, 2:5-dichloroaniline, nitrotoluidines, such as the compounds containing $CH_3:NH_2:NO_2=1:2:4$ or $1:2:5$; nitro-anisidines or phenetidines, such as the compounds containing $NH_2:O-alkyl:NO_2=1:2:4$ or $1:2:5$; chlorotoluidines, chloroanisidines, aminodiphenylether, aminoanthraquinones, aminoazo-compounds, in short quite generally the diazo-components contained in the literature pertaining to the manufacture of soluble azo-dyestuffs. As stabilizers are suitable, obviously, other compounds, such as zinc chloride, cadmium chloride, fluorosulfonic acid, benzenedisulfonic acid, toluenemonosulfonic acid, toluenedisulfonic acid, naphthalene-mono-, -di-, -tri- and tetra-sulfonic acids, phenol and naphthol-sulfonic acids, complex organic acids, like hydroborofluoric acid, complex cyanoacids, hydrofluorotitanic acid or the like.

The same process may be applied for the production of other preparations, for example preparations of indophenols. In this case the indophenol is taken up by the organic solvent. By evaporation of the latter it may be obtained free from inorganic constituents.

What I claim is:—

1. As an improvement in the production of dry diazo-preparations, the process of drying consisting in introducing the aqueous diazo-compounds into organic liquids which can be distilled without decomposition at atmospheric pressure, which are indifferent against diazo-compounds, and which can be evaporated below 50° C. at reduced pressure, then distilling the organic liquids with constant addition of fresh portions of the organic liquids until no more water is carried over, and subsequently separating the solid diazo-compound from the organic liquids by filtering.

2. As an improvement in the production of dry diazo-preparations, the process of drying consisting in introducing the aqueous diazo-compounds into organic liquids which are immiscible with water, which can be distilled without decomposition at atmospheric pressure, which are indifferent against diazo-compounds, and which can be evaporated below 50° C. at reduced pressure, then distilling the organic liquids with constant addition of fresh portions of the organic liquids until no more water is carried over, and subsequently separating the solid diazo-compound from the organic liquids by filtering.

3. As an improvement in the production of dry diazo-preparations, the process of drying consisting in introducing the aqueous diazo-compounds into organic liquids from a group consisting of the liquid hydrocarbons of the benzene series and the liquid halogen substitution products thereof, then distilling the organic liquids with constant addition of fresh portions of the organic liquids until no more water is carried over, and subsequently separating the solid diazo-compound from the organic liquid by filtering.

4. As an improvement in the production of dry diazo-preparations, the process of drying consisting in introducing the aqueous diazo-compounds into toluene, then distilling the toluene with constant addition of fresh portions of the toluene until no more water is carried over, and subsequently separating the solid diazo-compound from the toluene by filtering.

JULES BLANCHOD.